(12) United States Patent
Witschel

(10) Patent No.: US 6,640,207 B2
(45) Date of Patent: Oct. 28, 2003

(54) METHOD AND CONFIGURATION FOR FORMING CLASSES FOR A LANGUAGE MODEL BASED ON LINGUISTIC CLASSES

(75) Inventor: Petra Witschel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/844,931

(22) Filed: Apr. 27, 2001

(65) Prior Publication Data

US 2001/0051868 A1 Dec. 13, 2001

Related U.S. Application Data

(63) Continuation of application No. PCT/DE99/03176, filed on Oct. 1, 1999.

(30) Foreign Application Priority Data

Oct. 27, 1998 (DE) ........................................ 198 49 546

(51) Int. Cl.[7] ........................ G06F 17/27; G10L 15/00
(52) U.S. Cl. .......................................... 704/9; 704/257
(58) Field of Search ........................ 704/1, 9, 10, 255, 704/257

(56) References Cited

U.S. PATENT DOCUMENTS

| | | | |
|---|---|---|---|
| 3,812,291 A | | 5/1974 | Brodes et al. |
| 5,680,509 A | * | 10/1997 | Gopalakrishnan et al. .. 704/240 |
| 5,835,893 A | * | 11/1998 | Ushioda ...................... 704/257 |
| 5,839,106 A | * | 11/1998 | Bellegarda .................. 704/257 |

OTHER PUBLICATIONS

Hirokzu Masataki et al.: "Variable–Order N–Gram Generation by Word–Class Splitting and Consecutive Word Grouping", 1996 IEEE, XP002133222 pp. 188–191.
Hermann Ney et al.: "On Structuring Probabilistic Dependences in Stochastic Language Modeling" Computer Speech and Language, GB, 1994 Academic Press Limited, Jan. 1994, XP000452242, pp. 1–38.
T.R. Niesler et al.: "Comparison of Part–of–Speech and Automatically Derived Category–Based Language Models for Speech Recognition", 1998 IEEE, XP000854544 pp. 177–180.
Günther Ruske "Automatische Spracherkennung" R. Oldenbourg Verlag, München, 1988 ISBN 3–486–20877–2, pertains to automatic speech recognition pp. 1 10 (as mentioned on p. 1 of the Specification).
Lawrence Rabiner et al. "Fundamentals of Speech Recognition", PTR Prentice Hall, Englewood Cliffs, New Jersey 07632 pp. 447–450 (as mentioned on p. 2 of the Specification).
Petra Witschel "Constructing Linguistic Oriented Language Models for Large Vocabulary Speech Recognition" Siemens AG, ZFE ST SN 73, Munich, Germany, 4 pages (as mentioned on p. 3 of the Specification).
Helmut Feldweg et al. "Sonderdruck aus Lexicographica, Series Maior, Band 73—Das CISLEX Wörterbuchsystem" Max Niemeyer Verlag, Tübingen, 1996, pertains to the CISLEX dictionary system, pp. 69–82 (as mentioned on p. 3 of the Specification).
William Feller "An Introduction to Probability Theory and Its Applications—Probability Measures and Spaces" Princeton University, Second Edition, vol. II, pp. 124 and 125.
William Feller "An Introduction to Probability Theory and Its Applications—The Exponential and the Uniform Densities" Princeton University, Second Edition, vol. II, p. 22.
Sven Martin et al. "Algorithms for Bigram and Trigram Word Clustering" 1998 Elsevier Science B.V. pp. 20–37.

* cited by examiner

Primary Examiner—Patrick N. Edouard
(74) Attorney, Agent, or Firm—Laurence A. Greenberg; Werner H. Stemer; Gregory L. Mayback

(57) ABSTRACT

A method and a configuration for forming classes for a language model based on linguistic classes is described. In order to determine a language model, classes are formed which are based on linguistic classes and minimize a language model entropy. A superset of classes can be prescribed as exemplary text or as an additional language model.

20 Claims, 4 Drawing Sheets

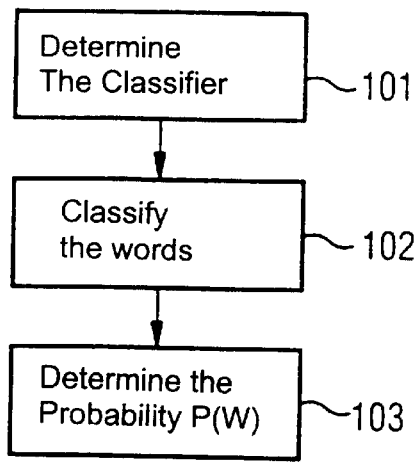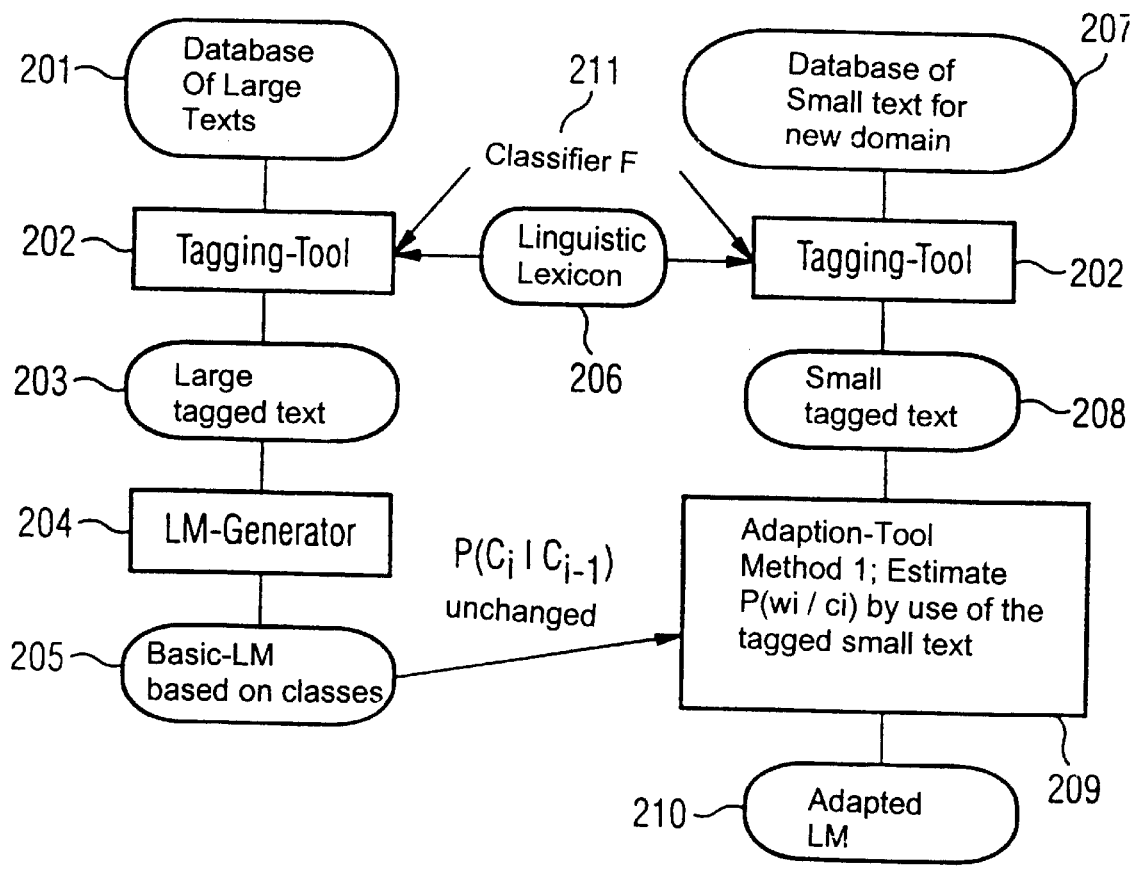

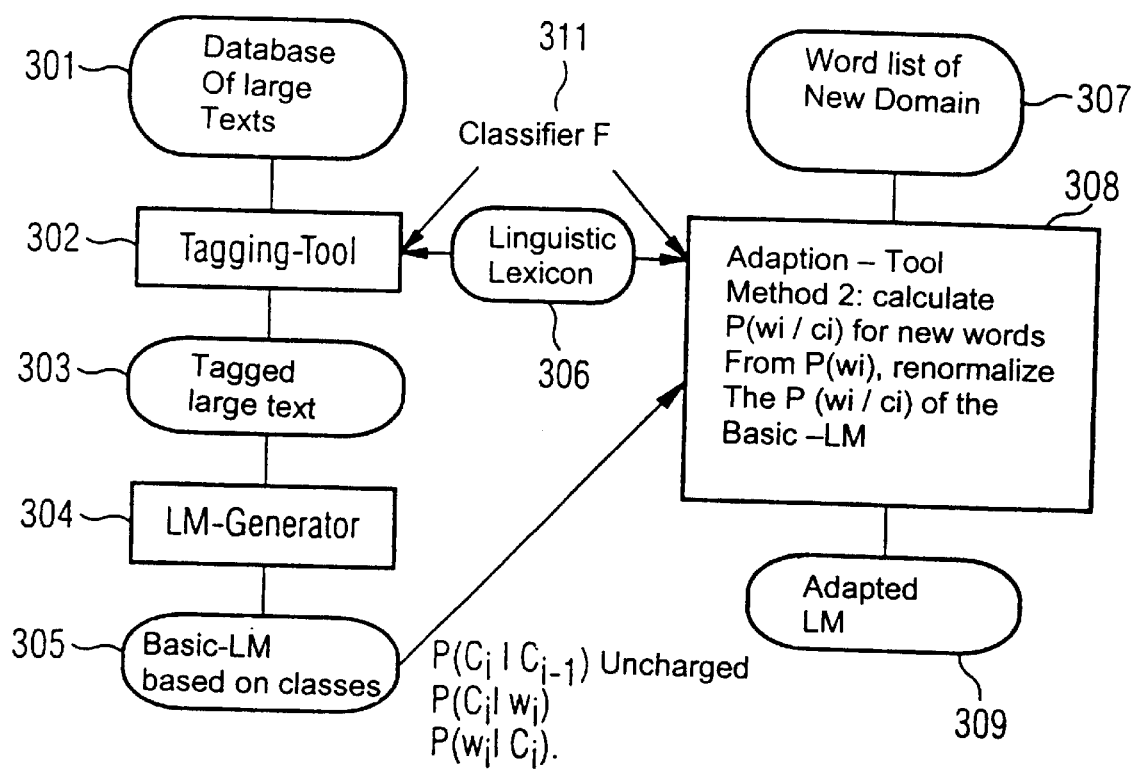
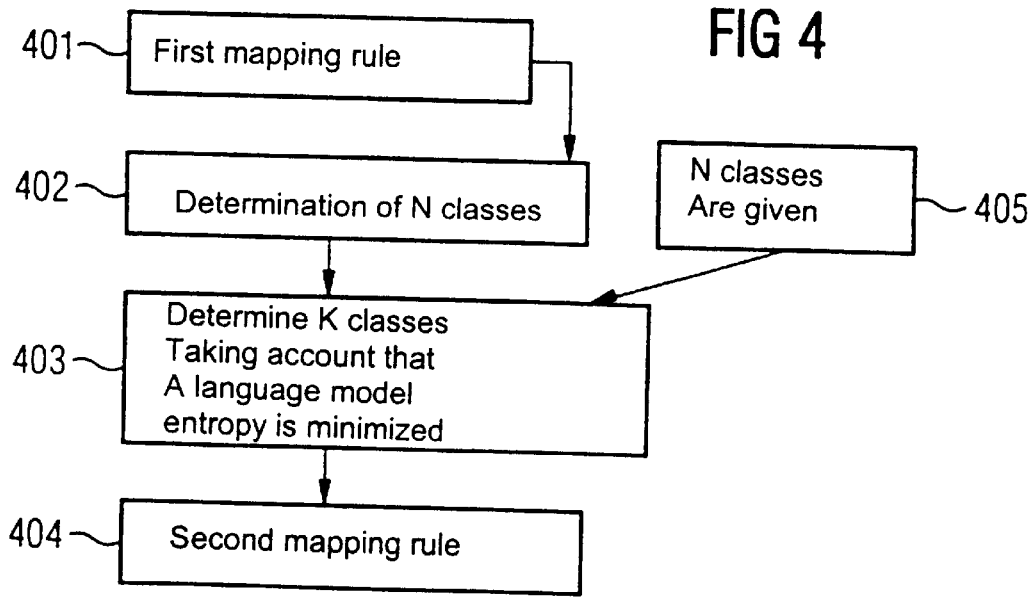

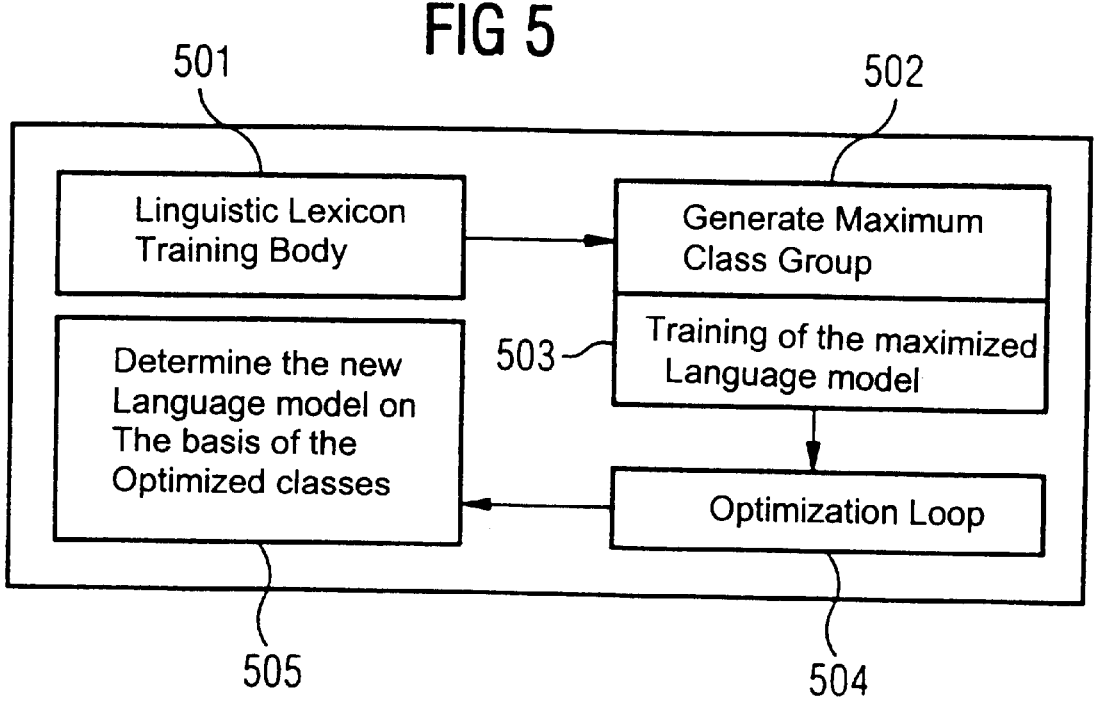
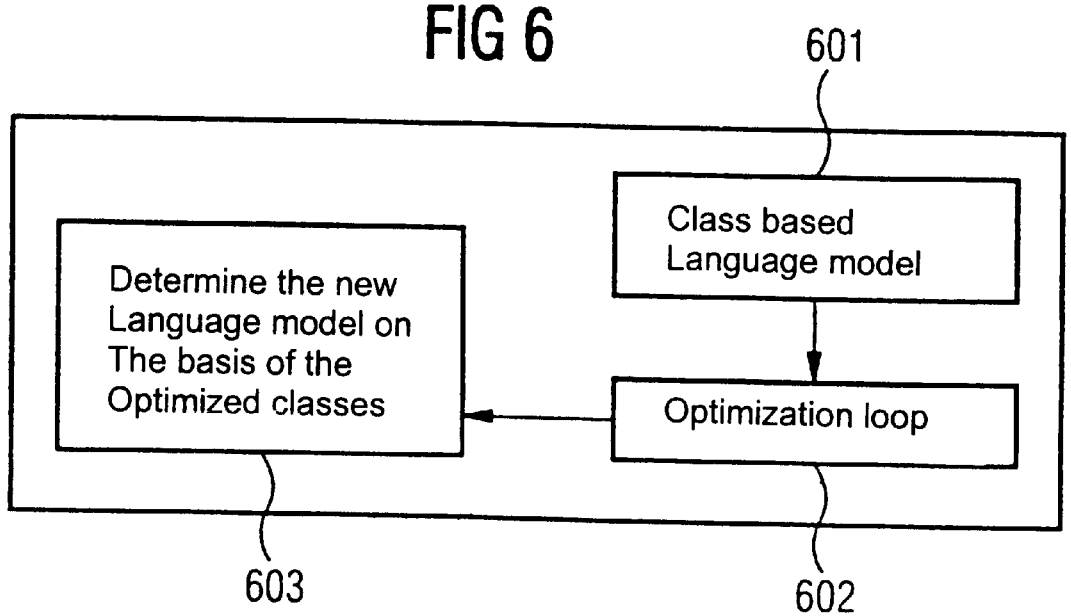

METHOD AND CONFIGURATION FOR FORMING CLASSES FOR A LANGUAGE MODEL BASED ON LINGUISTIC CLASSES

CROSS-REFERENCE TO RELATED APPLICATION

This application is a continuation of copending International Application No. PCT/DE99/03176, filed Oct. 1, 1999, which designated the United Stated.

BACKGROUND OF THE INVENTION

FIELD OF THE INVENTION

The invention relates to a method and a configuration for forming classes for a language model based on linguistic classes using a computer.

A method for speech recognition is known from the reference by G. Ruske, titled "Automatische Spracherkennung—Methoden der Klassifikation und Merkmalsextraktion" ["Automatic Speech Recognition—Methods of Classification and Feature Extraction"], Oldenbourg Verlag, Munich 1988, ISBN 3-486-20877-2, pages 1–10. It is customary in this case to specify the usability of a sequence of at least one word as a component of word recognition. A probability is one measure of this usability.

A statistical language model is known from the reference by L. Rabiner, B.-H. Juang, titled "Fundamentals of Speech Recognition", Prentice Hall 1993, pages 447–450. Thus, the probability P(W) of a word sequence W within the framework of speech recognition, preferably large quantities of vocabulary, generally characterizes a (statistical) language model. The probability P(W) (known as word sequence probability) is approximated by an N-gram language model $P_N(W)$:

$$P_N(W) = \prod_{i=0}^{n} P(w_i \mid w_{i-1}, w_{i-2}, \ldots, w_{i-N+1}), \qquad (0\text{-}1)$$

where
  $w_i$ denotes the ith word of the sequence W with (i=1 . . . n), and
  n denotes the number of words $w_1$ in the sequence W.
What are called bigrams result from equation (0-1) for N=2.

It is also known in speech recognition, preferably in the commercial field, to use an application field (domain) of limited vocabulary. Texts from various domains differ from one another not only with regard to their respective vocabulary, but also with regard to their respective syntax. Training a language model for a specific domain requires a correspondingly large set of texts (text material, text body), which is, however, only rarely present in practice, or can be obtained only with an immense outlay.

A linguistic lexicon is known from the reference by F. Guethner, P. Maier, titled "Das CISLEX-Wörterbuchsystem" ["The CISLEX Dictionary System"], CIS-Bericht [CIS report] 94-76-CIS, University of Munich, 1994. The reference is a collection, available on a computer, of as many words as possible in a language for the purpose of referring to linguistic properties with the aid of a search program. For each word entry ("word full form"), it is possible to extract the linguistic features relevant to this word full form and the appropriate assignments, that is to say the linguistic values.

The use of linguistic classes is known from the reference by P. Witschel, titled "Constructing Linguistic Oriented Language Models for Large Vocabulary Speech Recognition", 3rd EUROSPEECH 1993, pages 1199–1202. Words in a sentence can be assigned in different ways to linguistic features and linguistic values. Various linguistic features and the associated values are illustrated by way of example in Table 1 (further examples are specified in this reference).

TABLE 1

Examples of linguistics features and linguistic values

| Linguistic feature | Linguistic values |
| --- | --- |
| Category | substantive, verb, adjective, article, pronoun, adverb, conjunction, preposition, etc. |
| Type of substantive | abstract, animal, as part of the body, concrete, human, spatial, material, as a measure, plant, temporal, etc. |
| Type of pronoun | demonstrative, indefinite, interrogative, possessive, etc. |

On the basis of linguistic features $$(f_1, \ldots, f_m) \qquad (0\text{-}2)$$

and linguistic values $$(v_{11} \ldots v_{1j}) \ldots (v_{m1} \ldots v_{mj}) \qquad (0\text{-}3)$$

each word is allocated at least one linguistic class, the following mapping rule F being applied:

$$(C_1, \ldots, C_k) = F((f_1, v_{11}, \ldots, v_{1j}) \ldots (f_m, v_{m1}, \ldots, v_{mj})) \qquad (0\text{-}4)$$

where
  $f_m$ denotes a linguistic feature,
  m denotes a number of linguistic features,
  $v_{m1} \ldots v_{mj}$ denotes the linguistic values of the linguistic feature $f_m$,
  j denotes the number of linguistic values,
  $C_i$ denotes the linguistic class with i=1 . . . k,
  k denotes the number of linguistic classes, and
  F denotes a mapping rule (classifier) of linguistic features and linguistic values onto linguistic classes.

The class of the words with linguistic properties which are unknown or cannot be otherwise mapped constitutes a specific linguistic class in this case.

An example is explained below for the purpose of illustrating the linguistic class, the linguistic feature, the linguistic value and the class bigram probability.

The starting point is the German sentence:
  "the Bundestag is continuing its debate".

The article "the (English) or der (German)" (that is to say the first word) can be subdivided in German into six linguistic classes (from now on, only: classes), the classes being subdivided into number, gender and case. The following Table 2 illustrates this correlation:

TABLE 2

Classes $C_i$ for the German word "der" (in English the word is "the")

| $C_i$ | Category | Number | Gender | Case |
| --- | --- | --- | --- | --- |
| $C_1$ | Article | singular | Masculine | nominative |
| $C_2$ | Article | singular | Feminine | genitive |

TABLE 2-continued

Classes $C_i$ for the German word "der" (in English the word is "the")

| $C_i$ | Category | Number | Gender | Case |
|---|---|---|---|---|
| $C_3$ | Article | singular | Feminine | dative |
| $C_4$ | Article | plural | Feminine | genitive |
| $C_5$ | Article | plural | Masculine | genitive |
| $C_6$ | Article | plural | Neutral | genitive |

Table 3 follows similarly for the German substantive "Bundestag" (second word in the above example sentence):

TABLE 3

Classes $C_i$ for the word "Bundestag"

| $C_i$ | Category | Number | Gender | Case |
|---|---|---|---|---|
| $C_7$ | Substantive | singular | Masculine | nominative |
| $C_8$ | Substantive | singular | Masculine | accusative |
| $C_9$ | Substantive | singular | Masculine | dative |

It now follows in this example with regard to class bigrams, that is bigrams applied to linguistic classes, that the class $C_i$, followed by the class $C_7$, constitutes the correct combination of category, number, case and gender with reference to the example sentence. If frequencies of actually occurring class bigrams are determined from prescribed texts, it follows that the above class bigram $C_1$–$C_7$ occurs repeatedly, since this combination is present frequently in the German language, whereas other class bigrams, for example the combination $C_2$–$C_8$ is not permissible in the German language because of different genders. The class bigram probabilities resulting from the frequencies found in this way are correspondingly high (in the event of frequent occurrence) or low (if not permissible).

The reference by S. Martin, J. Liermann, H. Ley, titled "Algorithms for Bigram and Trigram Word Clustering", Speech Communication 24, 1998, pages 19–37, proceeds from statistical properties in forming classes. Such classes have no specific linguistic properties which can be appropriately used in the language model.

The conventional formation of classes is performed manually by employing linguists who sort a language model in accordance with linguistic properties. Such a process is extremely lengthy and very expensive, because of the experts.

SUMMARY OF THE INVENTION

It is accordingly an object of the invention to provide a method and a configuration for forming classes for a language model based on linguistic classes which overcome the above-mentioned disadvantages of the prior art methods and devices of this general type, permitting classes to be formed automatically and without the use of expert knowledge for a language model based on linguistic classes.

With the foregoing and other objects in view there is provided, in accordance with the invention, a method for forming classes for a language model based on linguistic classes using a computer. The method includes the steps of using a first mapping rule to determine N classes using a prescribed vocabulary with associated linguistic properties, determining K classes from the N classes by minimizing a language model entropy, and using the K classes to represent a second mapping rule for forming the classes of language models onto the linguistic classes.

In order to achieve the object, a method is specified for forming classes for a language model based on linguistic classes using a computer, in which a first mapping rule is used to determine a number N of classes by a prescribed vocabulary with associated linguistic properties. K classes are determined from the N classes (K<N) by minimizing a language model entropy. A second mapping rule, the formation of classes of the language model, is represented by the K classes.

It is advantageous in this case that classes can be formed in a completely automated fashion. No long-winded manual assignment is undertaken by specifically trained experts, nor is the linguistic significance of the classes undermined by statistical measures. The condition that K be less than N substantially reduces the amount of classes, and thus determines an effective language model.

A development consists in that the N classes are determined in that all possible combinations of linguistic features and associated linguistic values are determined, and each of the combinations leads to a dedicated linguistic class. The number N is therefore determined by the maximum possible number of classes (referred to the basic text).

Another development is to use a linguistic lexicon to determine the linguistic values. Such a linguistic lexicon is available, inter alia, for the German language (see the reference by F. Guethner, P. Maier, titled "Das CISLEX-Wörterbuchsystem" ["The CISLEX Dictionary System"], CIS-Bericht [CIS report] 94-76-CIS, University of Munich, 1994).

Also specified for achieving the object is a method for forming classes for a language model based on linguistic classes by a computer in which a first mapping rule is used to prescribe N classes. K classes are determined from the N classes by minimizing a language model entropy. The K classes are used to represent a second mapping rule for forming classes of language models which are based on linguistic classes.

The K classes are determined in an additional development by carrying out the following steps:
 a) a number M of the most probable of the N classes are determined as base classes; and
 b) one of the remaining (N–M) classes is merged with that base class for which the language model entropy is minimized.

In this case, the M most probable classes (referred to the basic text) are determined. The above steps can also be carried out by iteration for a plurality of or all the remaining (N–M) classes.

One embodiment consists in that the language model entropy is determined by the equation $$H(LM) = -\frac{1}{n} \cdot \log P(W), \qquad (1)$$

where
 H(LM) denotes the language model entropy of the language model,
 n denotes the number of words in the text,
 W denotes a chain of words $w_0, w_1, \ldots, W_n$, and
 P(W) denotes a probability of the occurrence of a sequence of at least two words.

Another embodiment consists in that the method described for determining a probability of the occurrence of a sequence of at least two words is used in speech recognition. A language has linguistic classes $$(C_1, \ldots C_k) \quad (2)$$

in accordance with $$(C_1, \ldots, C_k) = F((f_1, v_{11}, \ldots v_{1j}) \ldots (f_m, m_{m1}, \ldots v_{mj})) \quad (3)$$

where $f_m$ denotes a linguistic feature, m denotes the number of linguistic features, $v_{m1} \ldots v_{mj}$ denotes the linguistic values of the linguistic feature $f_m$, j denotes the number of linguistic values, $C_i$ denotes the linguistic class with i=1 ... k, k denotes the number of linguistic classes, and F denotes a mapping rule (classifier) of linguistic features and linguistic values onto linguistic classes.

At least one of the linguistic classes is assigned to a word in this case. A probability P(W) of the occurrence of the sequence of at least two words is yielded using bigrams as $$P(W) \approx \prod_{i=1}^{n} \sum_{C_i} \sum_{C_{i-1}} P(w_i | c_i) \times P(C_i | C_{i-1}) \times P(C_{i-1} | w_{i-1}) \quad (4)$$

where

W denotes the sequence of at least two words, $w_i$ denotes the ith word of the sequence W with (i=1 ... n), n denotes the number of words $w_i$ in the sequence W, $C_i$ denotes a linguistic class which belongs to a word $w_i$, $C_{i-1}$ denotes a linguistic class which belongs a word $w_{i-1}$, $\Sigma C_i$ denotes the sum of all linguistic classes C which belong to a word $w_i$, $P(w_i|C_i)$ denotes the conditional word probability, $P(C_i|C_{i-1})$ denotes the probability of bigrams (also: class bigram probability), and $P(C_{i-1}|w_{i-1})$ denotes the conditional class probability.

It may be noted here that the term $C_i$ relates to one of the at least one linguistic class which is assigned to the word $w_i$ from the word sequence W. The same holds correspondingly for the term $C_{i-1}$. For example, the class bigram probability is the probability that the word $w_i$ belongs to a first linguistic class under the condition that the preceding word $w_{i-1}$, belongs to a second linguistic class (see the introductory example with explanation on this point).

The probabilities $P(w_i|C_i)$ and $P(C_i|C_{i-1})$, which yield a so-called basic language model when input into equation (4), can be determined from a text body, that is to say from a prescribed text of prescribed size.

Language models which are based on linguistic classes offer decisive advantages, in particular for adaptation. The method presented here uses the linguistic properties contained in the language models.

One development consists in that for a new text a it predetermined basic language model is used to take over the probability $P(C_i|C_{i-1})$ into the basic language model for the new text.

Probabilities for class bigrams of the basic language model (see the reference by P. Witschel, titled "Constructing Linguistic Oriented Language Models for Large Vocabulary Speech Recognition", 3rd EUROSPEECH 1993, pages 1199–1202 and the explanation in the introduction) constitute a grammatical structure for the training text, and are independent of the vocabulary. Assuming that the new domain of similar text structure (grammatical structure) is like the original training text for the basic language model, it is expedient to take over the probability for the class bigrams $P(C_i|C_{i-1})$ unchanged from the basic language model.

The vocabulary for the new domain, for which a language model is determined, is processed with the aid of a prescribed linguistic lexicon and employing a classifier F in accordance with equation (3). At least one linguistic class is automatically determined for each new word from the text. See the reference by P. Witschel, titled "Constructing Linguistic Oriented Language Models for Large Vocabulary Speech Recognition", 3rd EUROSPEECH 1993, pages 1199–1202 for a detailed description of linguistic classes, linguistic features and linguistic values, and the reference by F. Guethner, P. Maier, titled "Das CISLEX-Wörterbuchsystem" ["The CISLEX Dictionary System"], CIS-Bericht [CIS report] 94-76-CIS, University of Munich, 1994 for the linguistic lexicon, and/or the introduction, in each case.

Another development relates to determining the probability $P(w_i|C_i)$ according to at least one of the following possibilities:

a) the probability $P(w_i|C_i)$ is determined with the aid of the text;

b) the probability $P(w_i|C_i)$ is determined for a word $w_i$ with the aid of a prescribed probability $P(w_i)$; and c) the probability $P(w_i|C_i)$ is determined by using a word list.

An additional development relates in that the determined probability $P(w_i|C_i)$ is used to adapt the basic language model. This is preferably performed in such a way that these determined probabilities $P(w_i|C_i)$ are adopted into the basic language model.

A further development is to determine the probability $P(C_{i-1}|w_{i-1})$ with the aid of the probability $P(w_i|C_i)$ as follows:

$$P(C_i|w_i) = K \times P(w_i|C_i) \times P(C_i) \quad (5)$$

where $$K = \left( \sum_{C_i} P(w_i | C_i) \times P(C_i) \right)^{-1} \quad (6)$$

denotes a normalization factor.

Another development relates to recognizing an appropriate sequence of at least one word if the probability P(W) is above a prescribed bound. A prescribed action is carried out if this is not the case. The prescribed action, is for example, outputting an error message or stopping the method.

In another development, the text relates to a prescribed application field, what is termed a (language, application) domain.

It is particularly advantageous in this case that the method presented requires a new text of only small size to determine a language model of a new domain.

It is also advantageous that lists of new words (with or without specification of the probability $P(w_i)$) can be used. Domain-referred speech recognition plays an important role in practice. The method therefore meets a real demand and has proved in experiments to be suitable and extremely useful. Going back to the basic language model, there is a substantial reduction in the number of probabilities to be estimated anew (estimation only of $P(w_i|C_i)$ necessary).

Furthermore, in order to achieve the object, a configuration for forming classes for a language model based on linguistic classes is specified which has a processor unit, which processor unit is set up or programmed in such a way that:

a) using a first mapping rule, a number N of classes can be determined by use of a prescribed vocabulary with associated linguistic properties;

b) K classes are determined from the N classes by minimizing a language model entropy; and c) the K classes are used to produce a second mapping rule for forming classes of language models into linguistic classes.

Also specified for the purpose of achieving the object is a configuration for forming classes for a language model based on linguistic classes in the case of which a processor unit is provided which is set up or programmed in such a way that:

a) N classes can be prescribed using a first mapping rule;

b) K classes are determined from the N classes by minimizing a language model entropy; and c) the K classes are used to produce a second mapping rule for forming classes of language models into linguistic classes.

These configurations are particularly suitable for carrying out the method according to the invention or one of its previously explained developments.

Other features which are considered as characteristic for the invention are set forth in the appended claims.

Although the invention is illustrated and described herein as embodied in a method and a configuration for forming classes for a language model based on linguistic classes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram which contains steps of a method for determining a probability of an occurrence of a sequence of at least one word in the case of speech recognition using a computer according to the invention;

FIG. 2 is a flow chart showing a first adaptation method for determining the probability $P(w_i|C_i)$;

FIG. 3 is a flow chart showing a second adaptation method for determining the probability $P(w_i|C_i)$;

FIG. 4 is a block diagram with steps of a method for forming classes for a language model;

FIG. 5 is a block diagram with components for automatically determining a mapping rule for forming classes;

FIG. 6 is a block diagram for optimizing an existing language model;

DESCRIPTION OF THE PREFERRED EMBODIMENTS

Figure 7:
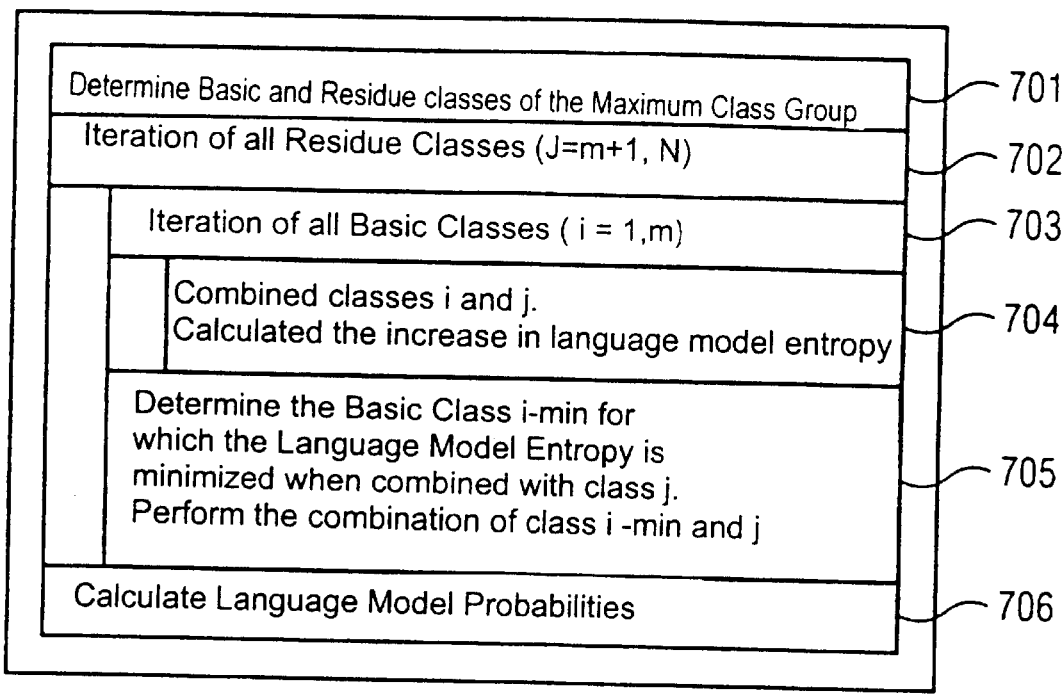
FIG. 7 is a flowchart of an optimization strategy for automatically forming classes.

In all the figures of the drawing, sub-features and integral parts that correspond to one another bear the same reference symbol in each case. Referring now to the figures of the drawing in detail and first, particularly, to FIG. 4 thereof, there is shown a block diagram with steps of a method for forming classes for a language model. In a first case, N classes are determined in accordance with a prescribed condition starting from a first mapping rule (see step 401). One possibility consists in determining the N classes as all the classes which can at most occur by determining all possible combinations of linguistic features and associated linguistic values, each of the combinations yielding a dedicated class (see step 402). K classes are determined in a step 403 with the aid of the N classes, taking account of the condition that a language model entropy is minimized. The K classes obtained in this way constitute a second mapping rule (see step 404) with the aid of which classes are formed on the basis of linguistic classes for a language model.

In a second case, the starting point is an existing language model with a first mapping rule and N prescribed classes (compare step 405). The following steps 403 and 404 permit the existing language model to be adapted by once again forming classes for a language model which is optimized by comparison with the original language model with regard to the linguistic classes.

The correlation illustrated in FIG. 4 is presented once again in FIG. 5 and FIG. 6.

As already mentioned, the aim in the present case is to find the mapping rule for forming classes based on linguistic properties which minimizes the language model entropy of the language model produced via these classes (also denoted below as optimization criterion). A mapping rule which assigns each word at least one linguistic class is required to generate language models on linguistic classes. The classes are formed on the basis of linguistic properties. Each word is allocated one or more classes in accordance with the linguistic features according to equation (0-2), and with the linguistic values according to equation (0-3). The linguistic features and the linguistic values are extracted in this case from a linguistic lexicon.

A mapping rule (classifier) F of the linguistic features and their linguistic values on classes is defined in accordance with equation (3). The first step is to determine a mapping rule L which produces the maximum possible number N of classes for a given vocabulary and linguistic properties prescribed from the linguistic lexicon:

$$L((f_1, v_{11}, \ldots, v_{1j})\ldots(f_m, v_{m1}, \ldots, v_{mj})) = C_I^L \quad (7)$$

with $I \in \{1, N\}$, where $(f_1, v_{11}, \ldots v_{1j}) \ldots (f_m, v_{m1}, \ldots v_{mj})$ denotes a feature/value combination of the domain lexicon.

The source of knowledge for this is a training body representing the given domain, and a linguistic lexicon containing its vocabulary (see block 501 in FIG. 5). The language model is trained (see block 503) on the maximum classes N (see block 502). See FIG. 2 and associated description for the training of the language model. The optimization is performed in a block 504; the maximum possible classes N are combined in such a way that an optimization criterion is fulfilled. A language model is determined based on the new K classes (see block 505).

As an alternative to a maximum language model, each class-based language model can be subjected to optimization. In this case, N classes are prescribed (see block 601, FIG. 6), the optimization loop (block 602) and the subsequent calculation of the new language model on the basis of the optimized classes (block 603) being analogous to FIG. 5.

In order to determine the maximum number N of classes, a determination is made of all the possible combinations of linguistic features in accordance with equation (0-2) and associated linguistic values in accordance with equation (0-3) which are contained in the linguistic lexicon as properties of the (domain) vocabulary. Each such feature/value combination is used to define a new word class of the maximum possible number N of classes. The mapping rule L, see equation (7), respectively forms one of the maximum possible feature/value combinations of the lexicon on one of the N classes of the maximum class set.

A mapping $\underline{OPT_M}$ which minimizes the entropy H(LM) of the language model LM($OPT_M$) is searched for in the optimization loop. The language model is based on the class division determined by $OPT_M$:

$$\underline{OPT_M} = \arg \min_{OPT_M \in \phi_M} H(LM((OPT_M)), \quad (8)$$

$\phi_M$ denoting a set of the possible mappings $OPT_M$ for which it holds that:

$$OPT_M(C_1^L, \ldots, C_N^L) = (C_1^O, \ldots, C_M^O) \quad (9)$$

where $$C_I^L$$

with I=1, ..., N denotes the classes of the maximum class set, and $$C_o^O$$

with o=1, ..., M denotes the classes of the optimized class set (K classes).

It therefore holds that:

$$C_o^O = \bigcup_{I \in \{1,N\}} C_I^L, \quad (10)$$

that is to say $$C_o^O$$

is the cluster of classes from the maximum class set. The cluster is yielded via linguistic features and linguistic values of the classes to be clustered. For example, $$C_1^L \cup C_2^L = \{w_i \mid A \vee B\} \quad (11)$$

where

A: $L((f_1(w_i), v_{11}(w_i), \ldots, v_{1j}(w_i))\ldots(f_m(w_i), v_{m1}(w_i), \ldots, v_{mj}(w_i))) = C_1^L$ and B: $L((f_1(w_i), v_{11}(w_i), \ldots, v_{1j}(w_i))\ldots(f_m(w_i), v_{m1}(w_i), \ldots, v_{mj}(w_i))) = C_2^L$.

The language model entropy H(LM) is given by equation (1), it being possible for P(W) to be an approximated value. Equation (4) holds for the value P(W).

An optimization strategy in the form of a flowchart is illustrated in FIG. 7. The classes N are merged in order to reduce their number. It is extremely expensive in practice to consider all the possibilities of clustering classes. It is therefore preferable to proceed otherwise: let M be the desired number of optimized classes. The probability values of the language model of the N classes are used in order to determine the most probable M classes among the N classes as base classes. The remaining N–M classes form the residue classes (see step 701 in FIG. 7). Within each loop of the optimization, one of the residue classes is merged with that base class such that an increase in the language model entropy is minimized in the process (see steps 702 to 705). If two classes are merged, the probabilities required in order to determine the growth in the language model entropy are recalculated (see step 706).

Figure 8:
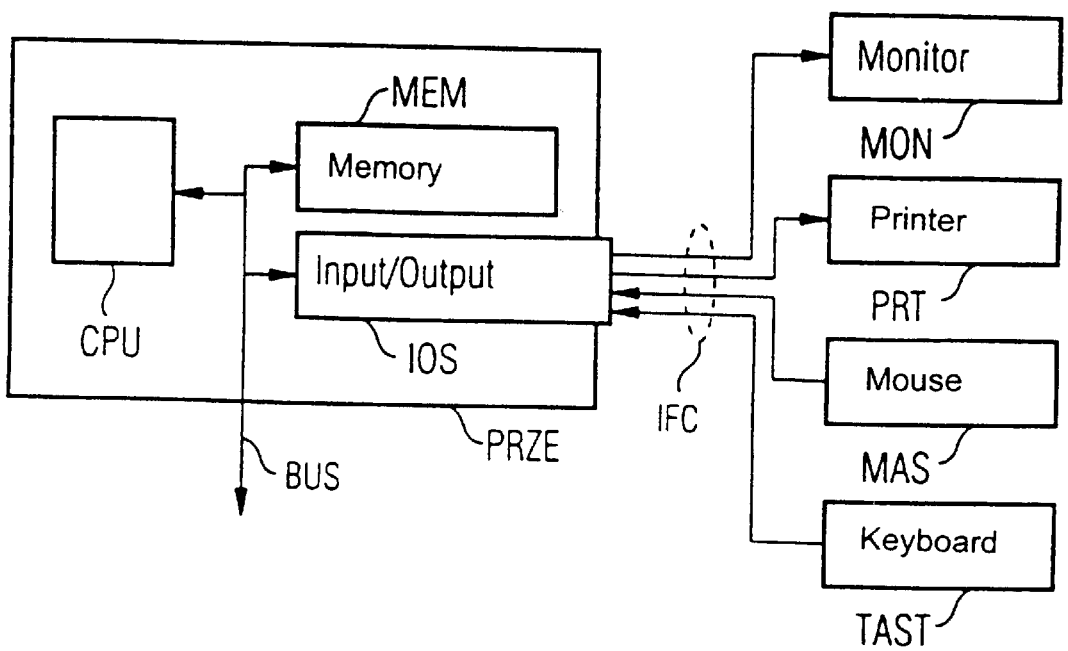
FIG. 8 is a block diagram of a processor unit.

A processor unit PRZE is illustrated in FIG. 8. The processor unit PRZE contains a processor CPU, a storage device MEM and an input/output interface IOS which is used in a different way via an interface IFC: via a graphics interface an output on a monitor MON is visualized and/or output on a printer PRT. Inputting is performed via a mouse MAS or a keyboard TAST. The processor unit PRZE also has a data bus BUS which ensures the connection of the memory MEM, the processor CPU and the input/output interface IOS. Furthermore, it is possible for additional components, for example additional memory, data storage (hard disk) or scanners to be connected to the data bus BUS.

FIG. 1 illustrates individual steps in the method for determining a probability of the occurrence of a sequence of at least two words during speech recognition by a computer. In a step 101, speech is subdivided into linguistic classes $$(C_1, \ldots C_k) \quad (2):$$

$$(C_1, \ldots, C_k) = F((f_1, v_{11}, \ldots v_{1j}) \ldots (f_m, v_{m1}, \ldots v_{mj})) \quad (3)$$

where $f_m$ denotes a linguistic feature, m denotes the number of linguistic features, $v_{m1} \ldots v_{mj}$ denotes the linguistic values of the linguistic feature $f_m$, j denotes the number of linguistic values, $C_i$ denotes the linguistic classes with i=1 ... k, k denotes the number of linguistic classes, and F denotes a mapping rule (classifier) of linguistic features and linguistic values onto linguistic classes.

A detailed explanation of the linguistic features and the linguistic values is to be found in the reference by P. Witschel, titled "Constructing Linguistic Oriented Language Models for Large Vocabulary Speech Recognition", 3rd EUROSPEECH 1993, pages 1199–1202, for example on page 1201 in Table 4 there is an exemplary list of linguistic features with associated linguistic values dependent on various categories.

A word is assigned at least one of the linguistic classes in a step 102. As described in the reference by P. Witschel, one or more of the linguistic classes can be assigned to a word.

Finally, in a step 103 the probability P(W) of the occurrence of the sequence of at least two words is determined by $$P(W) \approx \prod_{i=1}^{n} \sum_{C_i} \sum_{C_{i-1}} P(w_i \mid C_i) \times P(C_i \mid C_{i-1}) \times P(C_{i-1} \mid W_{i-1}) \quad (4)$$

where

W denotes the sequence of at least two words, $w_i$ denotes the ith word of the sequence W with (i=1 ... n), n denotes the number of words $w_i$ in the sequence W, $C_i$ denotes a linguistic class which belongs to a word $w_i$, $C_{i-1}$ denotes a linguistic class which belongs to a word $w_{i-1}$, $\Sigma C_i$ denotes the sum of all linguistic classes C which belong to a word $w_i$, $P(w_i|C_i)$ denotes the conditional word probability, $P(C_i|C_{i-1})$ denotes the probability of bigrams (also: class bigrams, bigram probability), and $P(C_{i-1}|w_{i-1})$ denotes the conditional class probability.

Equation (4) contains a cascaded multiplication of three components $$P(C_i|C_{i-1}), P(w_i|C_i) \text{ and } P(C_{i-1}|w_{i-1}),$$

which are determined individually below.

The determination of the probability $P(C_i|C_{i-1})$ is now discussed. As shown in equation (3), words in the text for the new domain are assigned to linguistic classes with the aid of a linguistic lexicon by using the classifier F. In the process, each new word is automatically assigned to at least one linguistic class. A basic language model contains probabilities for class bigrams, this probability on the one hand representing a grammatical structure, and on the other hand being independent of the individual words. If it is now assumed that the domain, that is to say the specific application-related subject, has a textual structure resembling the training text providing the foundation for the basic language model, the probability of class bigrams $P(C_i|C_{i-1})$ is taken over unchanged from the basic language model. Such automatic assignment is possible since it can be assumed, largely independently of the content of a text, that linguistic features and linguistic values, that is to say mapping into linguistic classes (see equation (3)), are characteristic of a language and can therefore advantageously be transferred from one subject (domain) to another subject. Grammatical structures of many training texts are similar or identical, independently of the subject (domain) on which the respective training texts are based. With reference to the class assignment of the vocabulary of the new text, the probability $P(C_i|C_{i-1})$ which was determined for the basic language model on the basis of preceding training passes constitutes basic knowledge which need not be redetermined, but can be taken over if the basic language model is sufficiently comprehensive.

The determination of the probability $P(w_i|C_i)$ is now discussed. The probability $P(w_i|C_i)$ is to be recalculated for all words $w_i$ which are new with reference to the basic language model, and the probability $P(w_i|C_i)$ (word probability) of the vocabulary present in the basic language model is preferably to be adapted correspondingly. Three different methods for determining the probability $P(w_i|C_i)$ are explained below.

Method 1

The probability $P(w_i|C_i)$ for all new words $w_i$ in the new domain is estimated on the basis of the text for the new domain. The starting point is a basic language model based on linguistic classes, the newly estimated probability $P(w_i|C_i)$ preferably being taken over into the basic language model, and the basic language model therefore being adapted with the aid of the new text. This mode of procedure is preferably used when the new text is of sufficient size for the new domain. Each word of the new text is allocated the at least one linguistic class determined in the sentence context. This is carried out with the aid of the tagging tool described in the reference by P. Witschel.

A first adaptation method for determining the word probability $P(w_i|C_i)$ is illustrated in FIG. 2. The classifier F 211 and the linguistic lexicon 206 are used in conjunction with the tagging tool 202 (see detailed explanations of the tagging tool in the reference by P. Witschel) both to determine a large "tagged" text 203 from a database from large texts 201, and to determine a small "tagged" text 208 from a database from a small text of the new domain (that is to say the new text) 207. A basic language model 205 based on linguistic classes is determined from the large "tagged" text 203 by a language model generator 204. As described above in detail, the probability $P(C_i|C_{i-1})$ features unchanged in the language model for the new domain. A new, preferably adapted, language model 210 is determined from the "tagged" small text 208 by an adaptation tool 209 which carries out estimation of the probability $P(w_i|C_i)$ by the "tagged" small text. A further language model can also be generated without limitation in addition to the described adaptation.

Method 2

A further method reduces the individual word probabilities $P(w_i|C_i)$ given by the basic language model, and transfers the reduced contribution to the vocabulary (words) to be supplemented in the respective linguistic class $C_i$. This is carried out independently of the respective values $P(w_i)$ of the new words.

The second adaptation method for determining the probability $P(w_i|C_i)$ is illustrated in FIG. 3. With the aid of the tagging tool 302, a "tagged" large text 303 is determined from a database from large texts 301 by the classifier F 311 and the linguistic lexicon 306. A basic language model 305 which is based on linguistic classes is set up from the "tagged" large text 303 with the aid of a language model generator 304. The probability $P(C_i|C_{i-1})$ is taken over unchanged from the basic language model 305. With the aid of a word list for the new domain 307, an adapted language model 309 is determined by an adaptation tool 308. Here, as well, an adaptation can contain a change or generation of a language model. The adaptation tool 308 calculates the probability $P(w_i|C_i)$ for new words from the probability $P(w_i)$, and renormalizes the probability $P(w_i|C_i)$ of the basic language model. This method is described in detail below.

The following variables are given by the basic language model:

$w_i$ vocabulary of the basic language model with i=1, ... , N,

N number of vocabulary of the basic language model, $N_C$ number of words in the respective class C of the basic language model, k number of classes in the basic language model, $P(C_j)$ for j=0, ..., k; unigram probabilities for the classes of the basic language model, $P(C_j|C_{j-l})$ for j=1, ..., k; bigram probabilities for the classes of the basic language model, and $P(w_i|C_j(w_i))$ and $P(C_j(w_i)|w_i)$ word probabilities of the basic language model for all words $w_i$, with $i=1, \ldots, N$, and all classes $C_j(w_i)$ with $j=0, \ldots, k$, for which it holds that: word $w_i$ is in the linguistic classes $C_j$.

The formation of linguistic classes in the language model for the new domain corresponds to the formation of linguistic classes for the basic language model. The classifier F (see equation (3)) of the basic language model is taken over. The number of linguistic classes K is therefore unchanged. The starting point for the new domain is texts of structure resembling training texts on which the basic language model is based. The probability of the class bigrams $P(C_i|C_{i-1})$ and the probability of class unigrams $P(C_j)$ of the basic language model remain unchanged.

It remains to consider the probability $P(w_i|C_j(w_i))$ and the probability $P(C_j(w_i)|w_i)$ which relate in each case to individual words. The probability $P(w_i|C_j(w_i))$ and the probability $P(C_j(w_i)|w_i)$ are recalculated for the words of the new domain which are not contained in the basic language model. Already existing probabilities of the words in the basic language model are not to be rescaled.

The following values are given for the new domain:

$w_h$ vocabulary of the new domain with $h=1, \ldots, L$, which is not contained in the basic language model, L number of vocabulary in the language model for the new domain (target language model), $L_C$ number of new words $w_h$ and of words $w_i$ of the basic language model in the respective (linguistic) class C, and $P(w_h)$ class-independent word probabilities in the new domain.

The probability $P(w_h)$ is given by a word list with word frequencies, and by the size of the basic text.

Estimation of the probability $P(C_j(w_h)|w_h)$. In order to estimate the probability $P(C_j(w_h)|w_h)$, in each case for the new vocabulary $w_h$, it is assumed that $P(C_j(w_h)|w_h)$ is approximately the same for words which are in the same class $C_j$. The following approximation therefore holds:

$$P(C_j|w_h) \approx \frac{1}{N_C} \times \sum_{i=1}^{N_C} P(C_j|w_i), \quad (12)$$

$w_i$ denoting all words of the basic language model which are in the class $C_j$.

The class $C_j$ will be examined by way of example in the following exposition. The class $C_j$ is denoted as class C below to simplify the discussion.

Existing probability values are to be renormalized. The "old" values are marked below with a tilde.

A further approximate solution to the equation (12) is the sum over the words $w_i$ for which all linguistic classes agree with the classes of the new word.

The following method is applied in order to calculate the new probability $P(w_h|C(w_h))$ and/or to renormalize the given probabilities $P(w_i|C(w_i))$:

a) determination of the proportion α of the new words in the vocabulary a) renormalization of $$\tilde{P}(w) \quad (13)$$

where:

$$P(w_i)=(1-\alpha)\times \tilde{P}(w_i) \quad (14)$$

determination of the proportion αx in accordance with equation (17)

c) determination of the proportion $1-\gamma_c$ of the new words in the class C, d) determination of $\tilde{P}(w_h|c$ in accordance with equation (23), e) determination of $\gamma_c$ according to equation (22), and f) determination of the probability $P(w_h|C(w_h))$ by:

$$P(w_h|C) = \frac{\gamma_C}{1-\alpha} \tilde{P}(w_h|C), \quad (15)$$

see also equation (22). The factor can be interpreted as the quotient of the proportions of the old words in the linguistic class C and the proportion of the old vocabulary in the overall vocabulary.

In order to determine the proportion α, it follows from equation (14) that:

$$1 = \sum_{i=1}^{N_C} \tilde{P}(w_i) = \sum_{i=1}^{N_C} P(w_i) + \sum_{h=N_C+1}^{L_C} P(w_h) = \quad (16)$$

$$= (1-\alpha) = \sum_{i=1}^{N_C} \tilde{P}(w_i) + \sum_{h=N_C+1}^{L_C} P(w_H)$$

from which it follows that:

$$\alpha = \sum_{h=N_C+1}^{L_C} P(w_h). \quad (17)$$

Bayes' theorem is applied to equation (12) in order to determine the proportion $\gamma_c$ (see the reference by W. Feller, titled "An Introduction to Probability Theory and its Applications", John Wiley & Sons, 1976, pages 124, 125 for this). It follows that:

$$P(w_h|C) = \frac{P(w_h)}{N_C} \times \sum_{i=1}^{N_C} \frac{P(w_i|C)}{P(w_i)}. \quad (18)$$

It can be shown with the aid of equation (18) and by using the normalization property for probability values (see the reference by W. Feller, titled "An Introduction to Probability Theory and its Applications", John Wiley & Sons, 1976, page 22) that:

$$\sum_{i=1}^{N_C} P(w_i|C) + \sum_{h=N_C+1}^{L_C} \frac{P(w_h)}{N_C} \times \sum_{i=1}^{N_C} \frac{P(w_i|C)}{P(w_i)} = 1. \quad (19)$$

It holds for $$P(w_i|C)=\gamma_C \times \tilde{P}(w_i|C) \quad (20)$$

with $\gamma_c \leq 1$ and $\tilde{P}(w_i|C)$ as old (not renormalized) distribution that:

$$\left(1 + \sum_{h=N_C+1}^{L_C} \frac{P(w_h)}{N_C} \times \sum_{i=1}^{N_C} \frac{\tilde{P}(w_i \mid C)}{P(w_i)}\right) \times \gamma_C = 1. \quad (21)$$

It follows from this with the aid of equation (14) that:

$$\gamma_C = \left(1 + \frac{1}{1-\alpha} \times \sum_{h=N_C+1}^{L_C} \tilde{P}(w_h \mid C)\right)^{-1} \quad (22)$$

with $$\tilde{P}(w_h \mid C) = \frac{P(w_h)}{N_C} \times \sum_{i=1}^{N_C} \frac{\tilde{P}(w_i \mid C)}{\tilde{P}(w_i)}. \quad (23)$$

Method 3

The probability $P(w_i|C_i)$ for words $w_i$ which are new with reference to the basic language model is approximated by using an appropriate word list. In this mode of procedure, the solution strategy is taken over by the method described under "method 2". The probability $P(w_h)$ which is not present in this case is approximated for the new words $w_h$. This is performed, in particular, as a function of a main category HC of the respective word $w_h$. The approximate result is:

$$P(w_h) \approx \frac{1}{N_{HC}} \times \left(\sum_{w_i \text{ from } HC} \left(\sum_{C_j(w_i)} P(w_i \mid C_j) \times P(c_j)\right)\right) \quad (24)$$

Properties of words $w_i$ of the basic language model are used for this purpose. $N_{HC}$ is a number of the vocabulary of the basic language model which is in the main category HC. The summation is performed over all classes $C_j$ of the basic language model to which the respective word $w_i$ belongs.

If no main category is known, the words $w_h$ can be assigned to the specific linguistic class of the words with linguistic properties which are unknown or cannot otherwise be mapped.

The determination of the probability $P(C_{i-1}|w_{i-1})$ is now described. Note that in equation (4) the probability $P(C_{i-1}|w_{i-1})$ has an index "i−1" which is written as index i below for the sake of simplicity.

The probability $P(C_i|w_i)$ is yielded in each case from the probability $P(w_i|C_i)$ which, as described above, has been determined as:

$$P(C_i|w_i) = K \times P(w_i|C_i) \times P(C_i) \quad (5)$$

with the aid of a normalization factor $$K = \left(\sum_{C_i} P(w_i \mid C_i) \times P(C_i)\right)^{-1}. \quad (6)$$

The linguistic class $C_i$ in this case runs through all linguistic classes possible for the word $w_i$. The probability $P(C_i)$ is taken over from the basic language model (unigram probability for respective linguistic class of the basic language model).

I claim:

1. A method for forming classes for a language model based on linguistic classes Using a computer, which comprises the steps of:

using a first mapping rule to determine N classes using a prescribed vocabulary with associated linguistic properties;

determining K classes from the N classes by minimizing a language model entropy, including:
  determining a number M of most probable of the N classes as base classes; and
  merging one of remaining classes (N−M) of the classes with one of the base classes for which the language model entropy is minimized; and using the K classes to represent a second mapping rule for forming the classes of language models onto the linguistic classes.

2. A method for forming classes for a language model based on linguistic classes using a computer, which comprises the steps of:

using a first mapping rule to determine N classes using a prescribed vocabulary with associated linguistic properties;

determining K classes from the N classes by minimizing a language model entropy;

using the K classes to represent a second mapping rule for forming the classes of language models onto the linguistic classes; and determining the language model entropy by use of equation $$H(LM) = -\frac{1}{n} \cdot \log P(W),$$

where
H(LM) denotes the language model entropy of the language model,
n denotes a number of words in a text,
W denotes a chain of the words $w_0, w_1, \ldots, w_n$, and
P(W) denotes a probability of an occurrence of a sequence of at least two of the words.

3. The method according to claim 2, which comprises determining the probability of the occurrence of the sequence of at least two of the words in a case of speech recognition, wherein a language has the linguistic classes:

$$(C_1, \ldots, C_k) = F((f_1, v_{11}, \ldots, v_{1j}) \ldots (f_m, v_{m1}, \ldots, v_{mj})),$$

where
$f_m$ denotes a linguistic feature,
m denotes a number of linguistic features,
$v_{m1} \ldots v_{mj}$ denotes linguistic values of the linguistic feature $f_m$,
j denotes a number of the linguistic values,
$C_1, \ldots, C_k$ denotes the linguistic classes,
k denotes a number of the linguistic classes, and
F denotes the second mapping rule (classifier) of the linguistic features and the linguistic values onto the linguistic classes;

assigning at least one of the linguistic classes to a word; and determining the probability of the occurrence of the sequence of at least two of the words by:

$$P(W) \approx \prod_{i=1}^{n} \sum_{C_i} \sum_{C_{i-1}} P(w_i | C_i) \times P(C_i | C_{i-1}) \times P(C_{i-1} | w_{i-1})$$

where
- P(W) denotes the probability of the occurrence of the sequence of at least two of the words,
- W denotes the sequence of the at least two words,
- $w_i$ denotes an ith word of the sequence W with (i=1 ... n),
- n denotes a number of the words $w_i$ in the sequence W,
- $C_i$ denotes a linguistic class C which belongs to the word $w_i$,
- $C_{i-1}$ denotes the linguistic class which belongs to the word $w_{i-1}$,
- $\Sigma C_i$ denotes a sum of all the linguistic classes C which belong to the word $w_i$,
- $P(w_i|C_i)$ denotes a conditional word probability,
- $P(C_i|C_{i-1})$ denotes a probability of bigrams, and
- $P(C_{i-1}|w_{i-1})$ denotes a conditional class probability.

4. The method according to claim 3, which comprises using a predetermined basic language model to determine for the text the probability $P(C_i|C_{i-1})$ of the text by taking over the probability $P(C_i|C_{i-1})$ from the basic language model.

5. The method according to claim 4, which comprises determining the conditional word probability $P(w_i|C_i)$ according to at least one of the following possibilities:
- determining the conditional word probability $P(w_i|C_i)$ with an aid of the text;
- determining the conditional word probability $P(w_i|C_i)$ for the word $w_i$ with an aid of a prescribed probability $P(w_i)$; and
- determining the conditional word probability $P(w_i|C_i)$ by using a word list.

6. The method according to claim 5, which comprises using the conditional word probability $P(w_i|C_i)$ determined to adapt the basic language model.

7. The method according tom claim 5, which comprises using the conditional word probability $P(w_i|C_i)$ to determine a probability $P(C_i|w_i)$ as follows:

$$P(C_i|w_i) = K \times P(w_i|C_i) \times P(C_i),$$

where $$K = \left( \sum_{C_i} P(w_i | C_i) \times P(C_i) \right)^{-1}$$

denotes a normalization factor.

8. The method according to claim 3, which comprises detecting an appropriate sequence of at least one word when the probability P(W) of the occurrence of the sequence of at least one word is above a prescribed bound, otherwise a prescribed action is carried out.

9. The method according to claim 8, which comprises performing the prescribed action by outputting one of an error message and a prompt to stop operating.

10. The method according to claim 4, wherein the text relates to a prescribed application field.

11. A. method for forming classes for a language model based on linguistic classes using a computer, which comprises the steps of:
- using a first mapping rule to prescribe N classes;
- determining IC classes from the N classes by minimizing a language model entropy, including:
  - determining a number M of most probable of the N classes as base classes; and
  - merging one of remaining classes (N−M) of the classes with one of the base classes for which the language model entropy is minimized; and
- using the K classes to represent a second mapping rule for forming the classes of language models onto the linguistic classes.

12. A method for forming classes for a language model based on linguistic classes Using a computer, which comprises the steps of:
- using a first mapping rule to prescribe N classes;
- determining K classes from the N classes by minimizing a language model entropy;
- using the K classes to represent a second mapping rule for forming the classes of language models onto the linguistic classes; and
- determining the language model entropy by use of equation $$H(LM) = -\frac{1}{n} \cdot \log P(W),$$

where
- H(LM) denotes the language model entropy of the language model,
- n denotes a number of words in a texts
- W denotes a chain of the words $w_0, w_1, \ldots, w_n$, and
- P(W) denotes a probability of an occurrence of a sequence of at least two of the words.

13. The method according to claim 12, which comprises determining the probability of the occurrence of the sequence of at least two of the words in a case of speech recognition, wherein a language has the linguistic classes:

$$(C_1, \ldots, C_k) = F((f_1, v_{11}, \ldots, v_{1j}) \ldots (f_m, v_{m1}, \ldots, v_{mj})),$$

where
- $f_m$ denotes a linguistic feature,
- m denotes a number of linguistic features,
- $v_{m1} \ldots v_{mj}$ denotes linguistic values of the linguistic feature $f_m$,
- j denotes a number of the linguistic values,
- $C_1, \ldots, C_k$ denotes the linguistic classes,
- k denotes a number of the linguistic classes, and
- F denotes the second mapping rule (classifier) of the linguistic features and the linguistic values onto the linguistic classes;

assigning at least one of the linguistic classes to a word; and determining the probability of the occurrence of the sequence of at least two of the words by:

$$P(W) \approx \prod_{i=1}^{n} \sum_{C_i} \sum_{C_{i-1}} P(w_i | C_i) \times P(C_i | C_{i-1}) \times P(C_{i-1} | w_{i-1})$$

where
- P(W) denotes the probability of the occurrence of the sequence of at least two of the words,
- W denotes the sequence of the at least two words,
- $w_i$ denotes an ith word of the sequence W with (i=1 ... n), n denotes a number of the words $w_i$ in the sequence W,
$C_i$ denotes a linguistic class C which belongs to the word $w_i$,
$C_{i-1}$ denotes the linguistic class which belongs to the word $w_{i-1}$,
$\Sigma C_i$ denotes a sum of all the linguistic classes C which belong to the word $w_i$,
$P(w_i|C_i)$ denotes a conditional word probability,
$P(C_i|C_{i-1})$ denotes a probability of bigrams, and
$P(C_{i-1}|w_{i-1})$ denotes a conditional class probability.

14. The method according to claim 13, which comprises using a predetermined basic language model to determine for the text the probability $P(C_i|C_{i-1})$ of the text by taking over the probability $P(C_i|C_{i-1})$ from the basic language model.

15. The method according to claim 14, which comprises determining the conditional word probability $P(w_i|C_i)$ according to at least one of the following possibilities:
  determining the conditional word probability $P(w_i|C_i)$ with an aid of the text;
  determining the conditional word probability $P(w_i|C_i)$ for the word $w_i$ with an aid of a prescribed probability $P(w_i)$; and
  determining the conditional word probability $P(w_i|C_i)$ by using a word list.

16. The method according to claim 15, which comprises using the conditional word probability $P(w_i|C_i)$ determined to adapt the basic language model.

17. The method according tom claim 15, which comprises using the conditional word probability $P(w_i|C_i)$ to determine a probability $P(C_i|w_i)$ as follows:

$$P(C_i|w_i) = K \times P(w_i|C_i) \times P(C_i),$$

where $$K = \left( \sum_{C_i} P(w_i | C_i) \times P(C_i) \right)^{-1}$$

denotes a normalization factor.

18. The method according to claim 13, which comprises detecting an appropriate sequence of at least one word when the probability P(W) of the occurrence of the sequence of at least one word is above a prescribed bound, otherwise a prescribed action is carried out.

19. The method according to claim 18, which comprises performing the prescribed action by outputting one of an error message and a prompt to stop operating.

20. The method according to claim 14, wherein the text relates to a prescribed application field.

* * * * *